United States Patent
Alugubelli et al.

(10) Patent No.: US 11,526,341 B2
(45) Date of Patent: Dec. 13, 2022

(54) CONFLICT RESOLUTION FOR DEVICE-DRIVEN MANAGEMENT

(71) Applicant: VMWARE, INC., Palo Alto, CA (US)

(72) Inventors: Nigitha Alugubelli, New York, NY (US); Jonathon Deriso, Atlanta, GA (US); Mohan Guttikonda, Bangalore (IN); Suman Rani, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/225,279

(22) Filed: Apr. 8, 2021

(65) Prior Publication Data
US 2022/0236972 A1    Jul. 28, 2022

(30) Foreign Application Priority Data

Jan. 25, 2021    (IN) .............................. 202141003449

(51) Int. Cl.
*G06F 8/61*     (2018.01)
*G06F 9/52*     (2006.01)
*G06F 9/48*     (2006.01)

(52) U.S. Cl.
CPC .............. *G06F 8/61* (2013.01); *G06F 9/4881* (2013.01); *G06F 9/52* (2013.01)

(58) Field of Classification Search
CPC ............. G06F 9/52; G06F 9/4881; G06F 8/65
See application file for complete search history.

(56) References Cited

U.S. PATENT DOCUMENTS

| 10,673,712 B1* | 6/2020 | Gosar ................. H04L 41/5096 |
| 10,719,336 B1* | 7/2020 | Tsybulnyk .......... G06F 9/44552 |
| 2008/0040181 A1* | 2/2008 | Freire .................. G06Q 10/103 705/7.26 |
| 2008/0097816 A1* | 4/2008 | Freire .................... G06Q 10/10 705/7.26 |
| 2020/0111041 A1* | 4/2020 | Levine ............. G06Q 10/06316 |
| 2021/0124610 A1* | 4/2021 | Gardner .................... G06F 8/63 |
| 2022/0164181 A1* | 5/2022 | Reddy .................... G06N 20/00 |

OTHER PUBLICATIONS

Schulz et al., "Facilitating cross-organisational workflows with a workflow view approach" (Year: 2004).*
Deelman et al., "The Evolution of the Pegasus Workflow Management Software" (Year: 2019).*
M.P. van der Aalst et al. "Advanced Topics in Workflow Management: Issues, Requirements, and Solutions" (Year: 2003).*

\* cited by examiner

*Primary Examiner* — Phillip H Nguyen
(74) *Attorney, Agent, or Firm* — Thomas Horstemeyer, LLP

(57) ABSTRACT

Disclosed are various embodiments for resolving conflicts between workflows in a workflow processing system. A plurality of workflows stored in a workflow queue are evaluated to identify a common dependency of the plurality of workflows. Then, a version hierarchy is created for the common dependency of the plurality of workflows, the version hierarchy identifying multiple versions of the common dependency. In response to execution of a first one of the plurality of workflows stored in the workflow queue, the version hierarchy can be evaluated to identify the most recent version of the common dependency. Then, installation of the most recent version of the common dependency can be initiated.

20 Claims, 9 Drawing Sheets

CONFLICT RESOLUTION FOR DEVICE-DRIVEN MANAGEMENT

RELATED APPLICATIONS

Benefit is claimed under 35 U.S.C. 119(a)-(d) to Foreign Application Serial No. 202141003449 filed in India entitled "CONFLICT RESOLUTION FOR DEVICE-DRIVEN MANAGEMENT", on Jan. 25, 2021, by VMware, Inc., which is herein incorporated in its entirety by reference for all purposes.

BACKGROUND

Various challenges can arise in the management of enterprise resources using a management service. Access to the capabilities of a device can be managed through the administration of compliance rules defined and enforced by the management service. The proliferation of personal tablet and smartphone devices, for example, has resulted in several companies and organizations allowing employees to use their own devices for enterprise purposes. The use of these personal devices can be associated with productivity gains and cost savings. The concept "bring your own device" (BYOD) for access to enterprise computing systems may have met initial resistance due to security concerns, but more and more companies are now looking to incorporate BYOD policies. This causes enterprises to manage a growing number of different desktop, tablet, and mobile devices, along with various platforms and operating systems available for adoption by users. Many enterprises include employees that work in various locations including a traditional workplace, temporary field workplaces, as well as from home. At the same time, complexity of processes utilized for protecting enterprise resources has increased, requiring higher bandwidth for the constant communication of the managed devices with the management service. Personal devices can frequently lose network connectivity, causing security issues, management failures, and delays. There is a need for a more efficient and effective device management paradigm.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Disclosed are various approaches for handing and resolving conflicts when implementing device management workflows on the client device. Many enterprises allow employees to work in various locations including traditional workplaces, temporary or field workplaces, as well as from home. At the same time, the complexity of processes utilized for protecting enterprise resources has increased, requiring higher bandwidth for the constant communication of managed devices with a management service. Personal devices can frequently lose network connectivity, causing security issues, management failures, and delays. Although many of these issues can be addressed using client-device-driven management workflows, unexpected errors can occur when a client device attempts to process or implement a workflow. For example, multiple workflows may depend on different versions of the same library or application be installed, or workflows may attempt to begin or continue execution during prohibited periods of time. Accordingly, various embodiments of the present disclosure improve the implementation of client-device-driven management workflows by handling conflicts between workflows in a manner that minimizes adverse impacts on the client device.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
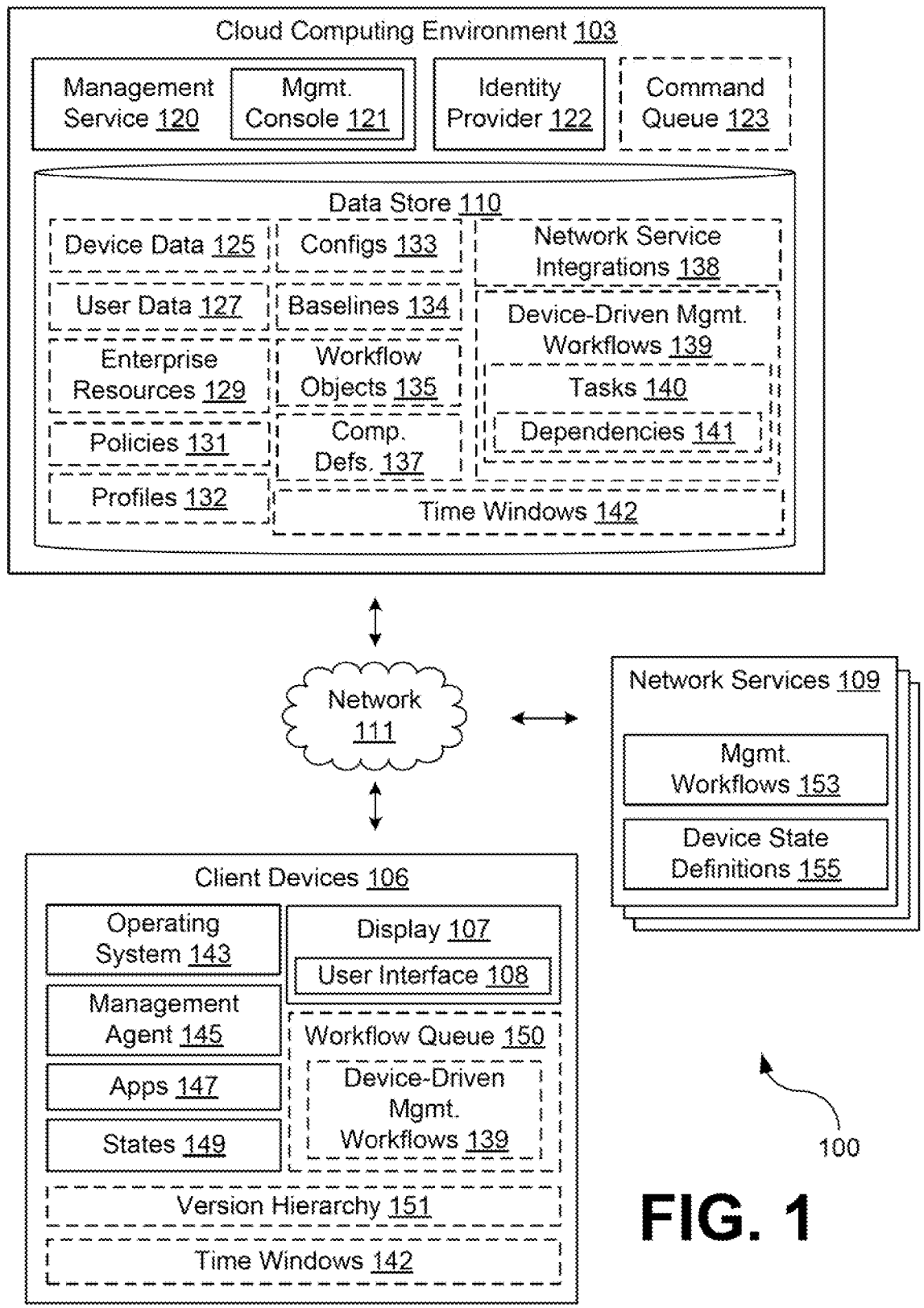
FIG. 1 illustrates an example networked environment that provides tools for device-driven management, according to various examples described herein.

With reference to FIG. 1, shown is a network environment 100 according to various embodiments. The network environment 100 can include a computing environment 103 and one or more client devices 106. The computing environment 103 and the client device(s) 106 can be in data communication with each other via a network 111. In the network environment 100, the computing environment 103 and the client device(s) 106 can communicate with or among each other over the network 111 using one or more network transfer protocols or interconnect frameworks, such as the hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client devices 106 are representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106. The client device 106 can also include one or more displays 107, such as liquid crystal displays (LCDs), gas plasma-based flat panel displays, organic light emitting diode (OLED) displays, electrophoretic ink ("E-ink") displays, projectors, or other types of display devices. In some instances, the display 107 can be a component of the client device 106 or can be connected to the client device 106 through a wired or wireless connection. The client device 106 can also be configured to render a user interface 108 on the display for an application executed by the client device 106. Examples of user interfaces 108 include web pages, application screens, and other graphical user interfaces (GUIs) or text user interfaces (TUIs).

The network 111 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., Wi-FI®), BLUETOOTH® networks, microwave transmission networks, as well as other networks relying on radio broadcasts. The network 11 can also include a combination of two or more networks 111. Examples of networks 111 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

The computing environment 103 can operate as an environment for mobile device management or a Unified Endpoint Management (UEM) platform that can manage the client devices 106, in that context, the computing environment 103 can include a data store 110.

The computing environment 103 can also execute a management service 120. The management service 120 can generate a management console 121 that includes a user interface through which an administrator or another user can manage client devices 106 that are enrolled with the management service 120. The administrator can access the management console 121 using a client device 106. An identity provider 122 can be hosted using the computing environment 103 or can be used as a network service 109 in conjunction with the management service 120. The data store 110 includes areas in memory for the storage of device data 125, user data 127, enterprise resources 129, policies 131, profiles 132, configurations 133, baselines 134, and other compliance rules. The data store 110 can also include workflow objects 135, comprehensiveness definitions 137, and device-driven management workflows 139, among other types of data. The management service 120 can operate as a UEM platform that can manage client devices 106 that are enrolled as managed devices with the management service 120. The management service 120 and the management console 121 can be accessible over a public wide area network (WAN) such as the Internet.

Device data 125 can represent information about client devices 106 that are enrolled as managed devices with the management service 120. The device data 125 can include a device identifier, certificates associated with the client device 106, a user identifier identifying the user account with which the device is linked, authentication tokens provided by the identity provider 122 to the client device 106, configuration profiles and compliance policies 131 assigned to the client device 106, and other information regarding the management of the client device 106 as an enrolled device. The device data 125 can also include a last-known compliance status associated with a managed client device 106. The compliance status can identify which compliance rules the client device 106 or a user account linked to the client device 106 has violated. For example, the client device 106 may have been taken outside of a specified geofence defined for the client device 106. The device data 125 can also indicate a device type and a platform of the client device 106. The device type can include desktop-type device, mobile-type device, tablet-type device, and the like. Device type can also refer to a device model or serial number. The platform of the client device 106 can be an indication of an operating system 143 such as Windows® 10, macOS®, iOS®, Android®, as well as other versions of the operating system 143.

User data 127 represents information about users who have user accounts with the management service 120 or an enterprise that uses the management service 120. These users can also have one or more client devices 106 that are enrolled as managed devices with the management service 120. User data 127 can include authentication data, and information about network services 109 with which the user is assigned an account. The user data 127 can include a user account associates, a user identifier, and one or more device identifiers for the client devices 106.

The management service 120 can enroll several client devices 106 for mobile device management services. To begin enrollment, the management service 120 can identify and authenticate one of the client devices 106 and store data related to the client device 106 in the device data 125 for later reference. In some cases, the management service 120 (or a management agent 145, an application 147, or another component executing on the client device 106) can also be registered as a device administrator (at least in part) of the client device 106, permitting the management service 120 to configure and manage certain operating aspects of the client device 106.

Once a client device 106 is enrolled for device management by the management service 120, the management service 120 can provide device-driven management workflows 139 for implementation on the client device 106. The device-driven management workflows 139 can enforce policies 131, profiles 132, configurations 133, security baselines 134, and other compliance rules. The device-driven management workflows 139 can also deploy enterprise resources 129, such as applications 147, data resources, and access to network services 109 that are federated with the identity provider 122.

The management service 120 can also maintain individual and group command queues 123 for the client device 106. A client device 106 can periodically check in and retrieve commands from the command queue 123. The management service 120 can also transmit a check-in notification to the client device 106 that includes instructions to check in. The check-in notification can be transmitted using a push notification service or another notification service, and the client device 106 can check in based on the notification. The management service 120 can provide the device-driven management workflows 139 by placing, in a command queue 123 for the client device 106, a command to execute the device-driven management workflow 139. The client device 106 can check in, retrieve the command, and download the device-driven management workflow 139 from a location specified by the command. Once received, the device-driven management workflow 139 can be implemented by the client device 106 without checking in with the command queue 123, including in scenarios where the client device 106 lacks a connection with the network 111 or otherwise lacks access to the command queue 123.

The management service 120 can also include, in the command queue 123, a command to provide states 149, completion statuses, and other status data associated with execution of the device-driven management workflow 139. The client device 106 can maintain a log of states 149, completion statuses, and other workflow status data regarding execution of the device-driven management workflow 139. The client device 106 can check in, retrieve the command to provide status data, and transmit the states 149, completion statuses, and other specified information from the log. In other examples, the management agent 145 can transmit this data to the management service 120 periodically, on a schedule, and at specified points in the device-driven management workflows 139. The management service 120 can identify success or failure of a portion of the device-driven management workflow 139 based on the states 149 and other information received.

A device-driven management workflow 139 can specify one or more actions 140 to be performed in order to enforce policies 131, profile 132, configurations 133, and/or security baselines 134 or to deploy enterprise resources 129, such as applications 147, data resources, and access to network services 109 that are federated with the identity provider 122. In some implementations, a device-driven management workflow 139 could be implemented as a state machine that specifies a sequence or series of tasks 140 to be performed based on the current state or states of the of the client device 106.

Each task 140 can represent an action to be performed by the client device 106 as part of a series or sequence of tasks 140 defined by the device-driven management workflow 139, where performance of the task 140 can be based at least on part on the current or previous state 149 or states 149 of the client device 106. Tasks 140 can be defined by using a state machine language (e.g., Amazon States Language) to specify a task or action to be performed based at least in part on the current or previous state 149 of the client device 106. The use of the state machine language can also specify the dependencies of the task 140 (e.g., other tasks 140 which must be performed prior to performance of the defined task 140). In addition, the device-driven management workflow 139 can also be represented using a state machine language, such as Amazon State Language.

Individual tasks 140 can also specify one or more dependencies 141. A dependency 141 can represent a resource (e.g., a configuration file, application, library, etc.) that an individual task 140 of a device-driven management workflow 139 requires in order to complete or be completed. For example, if a task 140 were to install an application 147 on a client device 106, the dependency could specify a specific version or minimum version of a library that the application 147 requires or a specific version or minimum version of the application 147 to be installed. For instance, the dependency 141 could specify that at least version 8.0 or higher of the specified library be installed or that at least version 10.0 or higher of the specified application 147 be installed. Multiple device-driven management workflows 139 could have tasks 140 that share a common dependency 141, such as the same configuration file, library or application 147 being installed on the client device 106.

One or more time windows 142 may also be stored in the data store 110. A time window 142 can represent a period of time that matches one or more classifications specified by an administrator using the management console 121. Time windows 142 can represent a single block of time (e.g., a three-hour block from noon to 3:00 p.m. on Friday the 13th), or a recurring block of time (e.g., a 10-hour block of time from 8:00 a.m. to 6:00 p.m. every weekday). Time windows 142 can also be assigned to one or more classes or classifications. For example, a time window 142 could be classified as "business hours," "maintenance period," etc.

Workflow objects 135 can include a set of graphical tools that can be used in the management console 121 to form device-driven management workflows 139. Each workflow object 135 can include instructions formatted using a particular syntax, such as a state machine language (e.g., Amazon State Language). Since the workflow objects 135 can be used to form the device-driven management workflows 139, each device-driven management workflow 139 can also use the syntax of the workflow objects 135. Workflow objects 135 can include instructions that install payloads, policies 131, profiles 132, configurations 133, baselines 134, and other enterprise resources 129. Workflow objects 135 can include instructions for evaluation of device states 149, policies 131, profiles 132, configurations 133, baselines 134, and device state definitions 155 such as evaluation of device-specific risk levels for a client device 106 based on its states 149. The workflow objects 135 can also include entry points that specify a group of client devices 106, for example, according to user group, device type, platform, other device data 125, and other user data 127.

The workflow objects 135 can also include connector workflow objects 135 between other workflow objects 135. Connector workflow objects 135 can specify conditions and states 149 under which a branch corresponding to that connector is to be implemented. Connector workflow objects 135 can extend from the evaluation workflow object 135. Evaluation workflow objects 135 can include if, while, for, AND, OR, NAND, NOR, and other conditions. The states 149 for respective branch connectors from an if-evaluation workflow object 135 can be mutually exclusive from states 149 for other branch connectors. Alternatively, the states 149 for branch connectors from an if-evaluation workflow object 135 can be evaluated in an order specified by the if-evaluation workflow object 135.

Comprehensiveness definitions 137 can identify a set of device states 149 or device conditions that a device-driven management workflow 139 can include in order to be considered comprehensive. In some cases, a comprehensiveness definition 137 can be generated for a particular enterprise based on the known device data 125 and user data 127 for the enterprise. In other cases, a comprehensiveness definition 137 can be generated for a particular user group or another logical grouping of client devices 106 using a filtered subset of the device data 125 and user data 127 for that logical grouping of client devices 106.

States 149 are a reference to the current or previous state of the client device 106 according to one or more criteria. The state 149 or states 149 of the client device 106 can also change in response to the management agent 145 implementing, processing, or otherwise executing one or more tasks 140 specified by a device-driven management workflow 139. For example, as the management agent 145 installs or updates applications 147 on the client device 106 as specified by a device-driven management workflow 139, the state 149 of the client device 106 would change to reflect the presence of the applications 147 as well as their current versions and any dependencies.

States 149 can include conditions on the client device 106 such as a platform of the client device 106, a type of the client device 106, a geolocation of the client device 106, a public or private network to which the client device 106 is communicatively connected, a user group associated with the client device 106, applications 147 that are installed on the client device 106, settings of the client device 106, and other device conditions. The following examples set forth a number of illustrative examples of different types of data that may be referred to or represented by the state 149 of the client device 106. However, it is understood that the following examples are not intended to limit the scope of the state 149 of the client device 106. For example, the state 149 of the client device 106 could refer to or represent a current or previous platform or operating system 143 of the client device 106, including a current or previous version of the platform or operating system 143. The state 149 could also refer to or represent a current or previous sensor value or range of sensor values detected by a sensor of the client device 106. The state 149 could also refer to or represent whether an application 147 is installed on the client device 106, or the specific version of the application 147 is installed on the client device 106. The state 149 could also refer to or represent whether a script has been executed on the client device 106, the version of the script that was executed, or the result of the execution of the script. The state 149 could also refer to or represent whether a file is stored on the client device 106, or the version of the file stored on the client device 106. The state 149 could also refer to or represent a total, used, or available amount of storage, memory, compute, or network bandwidth for the client device 106. The state 149 could also refer to or represent a current network address or IP address of the client device 106. The state 149 could also refer to or represent a geolocation or physical location of the client device 106. The state 149 could also refer to or represent a model or type of the client device 106.

The management service 120 can analyze the device data 125 and the user data 127 for a particular logical grouping of client devices 106 and generate a comprehensiveness definition 137 that includes a superset of conditions including platforms, states 149, user groups, networks, geolocations, and applications 147 for the logical grouping of client devices 106. The management service 120 can identify a logical grouping of client devices 106 relevant to a device-driven management workflow 139.

Comprehensiveness definition 137 can be static or dynamic. For example, a user can access the management console 121 and begin designing a device-driven management workflow 139. The management service 120 can analyze the workflow objects 135 of the device-driven management workflow 139 and determine that the device-driven management workflow 139 is limited to a particular user group, a particular operating system, or both. The management service 120 can identify a logical grouping of client devices 106 based on the current limitations of the device-driven management workflow 139. The management service 120 can generate a dynamic workflow-specific comprehensiveness definition 137 that includes a superset of conditions including platforms, states 149, user groups, networks, geolocations, and applications 147 limited to the workflow-specific logical grouping of client devices 106. The management console 121 can provide recommendations for the device-driven management workflow 139 based on the workflow-specific comprehensiveness definition 137.

In another example, the user can select a static comprehensiveness definition 137 that includes conditions including platforms, states 149, user groups, networks, geolocations, and applications 147 for comprehensive coverage of client device 106. Even if the device-driven management workflow 139 is currently limited to devices that do not correspond to the static comprehensiveness definition 137, the management console 121 can provide recommendations for the device-driven management workflow 139 based on the broader set of conditions of the static comprehensiveness definition 137. Recommendations can identify locations such as workflow objects 135 and branching locations where a condition can be added to the device-driven management workflow 139. The comprehensiveness definitions 137 can be used by the management console 121 to provide recommendations for device conditions, states 149, applications 147, and enterprise resources 129 to include in a particular device-driven management workflow 139.

Unlike traditional management workflows that are directed by the management service 120, the device-driven management workflows 139 enable an end user's client device 106 to direct deployment operations to install policies 131, profiles 132, configurations 133, security baselines 134, and other compliance rules, as well as applications 147, certificates, and other enterprise resources 129. To this end, device-driven management workflows 139 can include a branching sequence of instructions that branches based on states 149 that are evaluated on the end user's client device 106. States 149 can be evaluated by a management agent 145 based on instructions in the device-driven management workflows 139 once delivered. As a result, the path that is ultimately executed for a single device-driven management workflow 139 can be different for different client devices 106 that include different states 149.

The management service 120 can also provide a management console 121 as an engine and console interface for device management of the client devices 106. An information technology administrator or user, for example, can view, administer, and update client-device driven management workflows 139 using the management console 121. The client-device driven management workflows 139 can be deployed or transmitted to a set of the client devices 106 to install and enforce policies 131, profiles 132, configurations 133, security baselines 134, and other compliance rules. The client-device driven management workflows 139 can also install applications 147, and other components that enable access to network services 109 and enterprise resources 129. The compliance rules can be collectively administered for several of the client devices 106 by organizing the client devices 106 into several different groups or categories of devices according to organizational, platform, and other factors.

The management console 121 can include a workflow creation user interface area. The workflow creation user interface area can include a drag-and-drop canvas user interface area that shows the workflow objects 135 of a device-driven management workflow 139 in a workflow view; a programming language user interface area that shows the workflow objects 135 of a device-driven management workflow 139 in text instructions or code form; or a list or tree view that shows the workflow objects 135 of a device-driven management workflow 139.

The identity provider 122 can provide single sign-on or identity management capabilities for access to enterprise resources 129 through the management service 120 as well as network services 109. The identity provider 122 can allow users to authenticate his or her identity to obtain an authentication token that can be provided to a network service 109. The identity provider 122 can utilize OAuth, security assertion mark-up language (SAML), or other single sign-on methodologies. The identity provider 122 and management service 120 can communicate so that the management service 120 can revoke or authorize access to various services for users in the enterprise based on the status of a client device 106 assigned to the user. The identity provider 122 can also rely on user data 127 in the data store 110. In some examples, the identity provider 122 can rely upon a separate source of user data in a separate data store.

The network service 109 can be embodied as one or more computers, computing devices, or computing systems. Like the computing environment 103, the network service 109 can include one or more computing devices arranged, for example, in one or more server or computer banks. The computing device or devices can be located at a single installation site or distributed among different geographical locations. The network service 109 can include a plurality of computing devices that together embody a hosted computing resource, a grid computing resource, or other distributed computing arrangement. The network service 109 can also be embodied, in part, as certain functional or logical (e.g., computer-readable instruction) elements or modules as described herein. The network service 109 can be provided by an enterprise to its users and can include first- and third-party network services 109 with respect to the management service 120. For example, a network service 109 can include an optional service from a provider of the management service 120 or can be a third-party network service 109. The management workflows 153 and the device state definitions 155 from a third-party network service 109 can be referred to as third-party management workflows 153 and third-party device state definitions 155. The network service 109 can federate its authentication for users of the enterprise to the identity provider 122. The network service 109 can be accessible over the Internet or another public WAN.

An example client device 106 can be enrolled by the management service 120 for device management. A management agent 145 can be installed on a client device 106 to locally manage the device using device-driven management workflows 139 that are provided by the management service 120. The management agent 145 can be installed with elevated privileges or be effectuated through operating system APMs to manage the client device 106 on behalf of the management service 120. The management agent 145 can have the authority to manage data on the client device 106, install, remove, or disable certain applications, or install configuration profiles, such as VPN certificates, Wi-Fi profiles, email profiles, etc.

The management agent 145 can also have the authority to enable or disable certain hardware features of the client device 106 that are specified for a particular branch of a device-driven management workflow 139. The management agent 145 can also place the device into different hardware modes, such as airplane mode, silent mode, do-not-disturb mode, or other modes supported by the client device 106.

The management agent 145 can perform device-driven management workflows 139 to alter the operation of the client device 106 in response to changes in states 149 that are detected on the client device 106. The management agent 145, in one instance, can periodically poll the operating system 143, a data store, or other software and hardware components of the client device 106 to identify states 149 that are indicated in a device-driven management workflow 139.

The device-driven management workflows 139 can include appropriate commands in response to certain states 149. Commands can include generating a notification on the client device 106, sending a notification to an administrator, sending a notification and other compliance data to the management service 120, changing a non-compliant state 149 to a compliant state 149, deleting applications 147 and other enterprise resources, ending a SSO session with the identity provider, removing access to enterprise resources, and other management actions on the client device 106. In one example, the management agent 145 can detect that the client device 106 is out of compliance with respect to a compliance rule indicated in device-driven management workflows 139 and might instruct the management agent 145 to restrict a hardware feature of the client device 106, delete data from the client device 106, or disable certain applications on the client device 106. The management agent 145 can also take other variations of management actions on the client device 106 as directed by the device-driven management workflows 139.

As part of the enrollment process, the management service 120 and/or management agent 145 can be registered as a device administrator of the client device 106, permitting the management service 120 and/or management agent 145 to manage certain operating aspects of the client device 106. In either case, the management service 120 can remotely configure the client device 106 by interacting with the management agent 145. The device-driven management workflows 139 can also indicate various applications 147 and software components to install on the client device 106. Such software components can include, for example, applications, resources, libraries, drivers, device configurations, or other related components. The device-driven management workflows 139 can also indicate network locations where the software components can be downloaded for installation. The device-driven management workflows 139 can also indicate to download and install compliance rules and instruct the management agent 145 and the operating system 143 of the client device 106 to enforce the compliance rules.

The client device 106 can also store a workflow queue 150. The workflow queue 150 can be used to store device-driven management workflows 139 retrieved from the management service 120 for later implementation or execution by the management agent 145. In some implementations, device-driven management workflows 139 could be performed in the order they are stored in the workflow queue 150. Accordingly, the management agent 145 could evaluate individual device-driven management workflows 139 to identify common dependencies 141 for individual tasks 140 of the device-driven management workflows 139. The identification of common dependencies 141 would allow for the management agent 145 to resolve a common dependency 141 once for multiple device-driven management workflows 139 compared to repeating, resolving, or reimplementing the common dependencies 141 multiple times when each separate device-driven management workflow 139 is processed or executed.

Common dependencies 141 are those dependencies 141 which may be shared by multiple tasks 140. Individual tasks 140 that share a common dependency 141 could be components or steps of separate device-drive management workflows 139. For example, if two device-driven management workflows 139 had a task 140 to install an application 147 or a library, the common dependency 141 would be installation of the application 147 or library. Where a common dependency 141 involves multiple versions of a resource (e.g., configuration file, application 147, library, etc.), a version hierarchy 151 can be can created by the management agent 145 to track and resolve which version of the common dependency 141 would be the most appropriate version to resolve the common dependency 141.

The version hierarchy 151 can represent a hierarchy of identified common dependencies 141 according to one or more criteria. For example, if several tasks 140 specify a dependency that a particular configuration file, library, or application 147 be installed, the version hierarchy 151 could represent which versions of the configuration file, library, or application 147 are specified by individual tasks 140. Moreover, the version hierarchy 151 could track which workflows are dependent on the highest or most recent version of the configuration file, library, or application 147, and which workflows are dependent on a lower or older version of the configuration file, library, or application 147. In some implementations, each dependency 141 for a task 140 in a device-driven management workflow 139 could have an associated version hierarchy 151. In other implementations, only dependencies 141 that are shared across or common to multiple tasks 140 or device-driven management workflows 139 could have an associated version hierarchy 151.

The management workflows 153 can include enterprise management workflows 153 for an enterprise employing the management service 120. The device state definitions 155 can include device state definitions 155 and enterprise device state definitions 155. The network services 109 can include previous or legacy management services, community network sites where management workflows 153 and device state definitions 155 can be publicly posted and accessed, private servers to which an enterprise has access, and other services.

The management service 120 can include network service integrations 138 that enable the management service 120 to identify and retrieve first- and third-party resources including the management workflows 153 and device state definitions 155. The management service 120 can display these resources in the management console 121. The management service 120 can also allow management workflows 153 and device state definitions 155 to be imported and translated into device-driven management workflows 139. A device state definition 155 can be reformatted using a particular syntax to form a new or modified workflow object 135, or a device-driven management workflow 139 capable of assessing the device state definitions 155 on a client device 106. A management workflow 153 can be retrieved and reformatted into a device-driven management workflow 139 that is expressed using a set of workflow objects 135.

Figure 2:
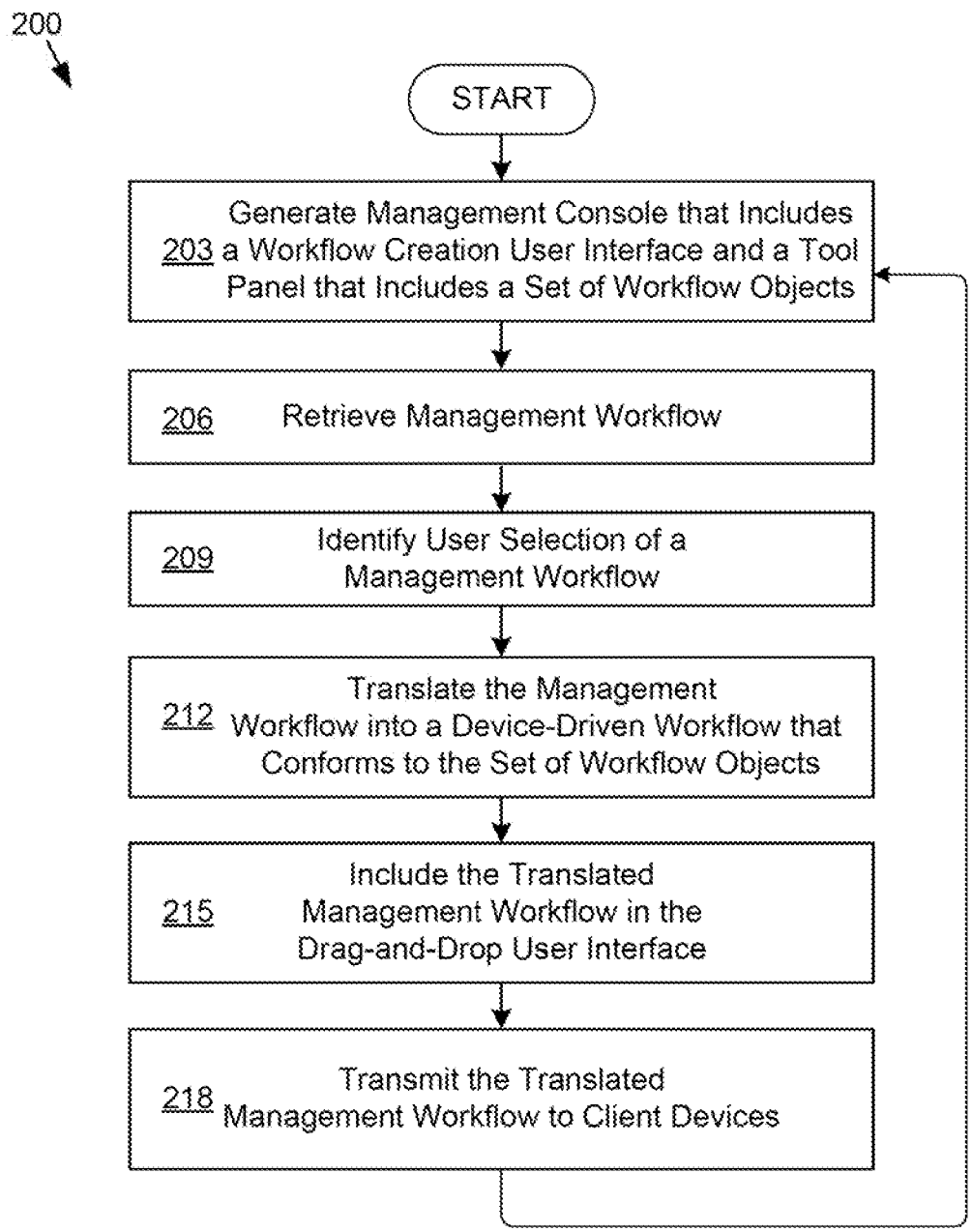
FIG. 2 illustrates a flowchart performed by components of the networked environment for device-driven management, according to various examples described herein.

FIG. 2 shows a flowchart 200 performed by components of the networked environment 100. Specifically, the flowchart 200 describes how the management service 120 provides tools that can import the resources from network services 109 and translate them into workflow objects 135 and device-driven management workflows 139. While the flowchart 200 is described as performed by the management service 120, it can also be considered functionality performed by the management console 121. Certain functionality described for the flowchart 200 can also be performed by other components of the networked environment 100. Segmentation and ordering indicated in the flowchart 200 is for example purposes only. The functionality described for a particular step can be performed in any order relative to the other steps described.

At step 203, the management service 120 can generate a management console 121 that includes a workflow creation user interface area and a tool panel that includes a set of workflow objects 135. The workflow creation user interface area can include a drag-and-drop canvas user interface area that shows the workflow objects 135 of a device-driven management workflow 139 in a workflow view. The workflow objects 135 can be selected, placed, moved, and connected in the drag-and-drop canvas to form device-driven management workflows 139. Other views and manipulation types can also be used as described.

Device-driven management workflows 139 can include a branching sequence of instructions that branches based on states 149 that are evaluated on the end user's client device 106. A path that is ultimately performed and executed for a single device-driven management workflow 139 can be different for different client devices 106 based on the particular states 149 of the devices.

The workflow objects 135 can include instructions that can be performed by the management agent 145, as well as a graphical representation that can be manipulated in the management console 121 to form device-driven management workflows 139. Each workflow object 135 can be represented by an icon or another graphical representation. Workflow objects 135 can include instructions that install payloads, policies 131, profiles 132, configurations 133, baselines 134, and other enterprise resources 129. Workflow objects 135 can include instructions that evaluate device states 149, policies 131, profiles 132, configurations 133, baselines 134, and device state definitions 155 such as evaluation of device-specific risk levels for a client device 106 based on its states 149.

The workflow objects 135 can also include entry points. Entry points can be the starting point for a device-driven management workflow 139. Different types of workflows can have different types of entry points. For example, a provisioning device-driven management workflow 139 can have an entry point that specifies a group of client devices 106 according to user group, device type, platform, other device data 125, and other user data 127. A smart application device-driven management workflow 139 can have an entry point that specifies an application workflow object 135 that triggers its execution. A state evaluation device-driven management workflow 139 can have an entry point that specifies to periodically poll for a state 149. A state evaluation device-driven management workflow 139 can be deployed as an enforcement mechanism that performs a branching set of instructions based on adherence to or violation of policies 131, profiles 132, baselines 134, required or prohibited applications 147, and other states 149.

In step 206, the management service 120 can retrieve resources from a network service 109. The management service 120 can include network service integrations 138 that enable communication with the network services 109. For example, the network service integrations 138 can include components that specify a network address of a network service 109 where resources including management workflows 153 and device state definitions 155 can be retrieved. The management service 120 can parse the text of management workflows 153 or device state definitions 155 to detect a syntax of the resource. The management service 120 can then identify predetermined translation instructions and translate the resource into different syntax in order to generate a workflow object 135 or device-driven management workflow 139.

In some cases, the network service 109 can include a public website where the public can post management workflows 153 and device state definitions 155. In other examples, the network service 109 can include a private website where an enterprise can store management workflows 153 and device state definitions 155. The management service 120 can include credentials, certificates, and other components that enable the management service 120 to authenticate with the network service 109. The management service 120 can also allow a user or administrator to log in with a single sign on credential and use the identity provider 122 to authenticate with multiple network services 109.

In step 209, the management service 120 can identify a user-selection of a network-retrieved management resource such as a management workflow 153 or a device state definition 155 from the management console 121. The management service 120 can generate the management console 121 to include user-selectable interface elements for the management workflows 153 and device state definitions 155 that are retrieved from the network service 109. The management service 120 can identify a user selection of an interface element for a management workflow 153 or device state definition 155.

In step 212, the management service 120 can translate the management workflow 153 into a device-driven management workflow 139. The management service 120 can generate a device-driven management workflow 139 that conforms to the set of workflow objects 135 provided by the management console 121. The device-driven management workflow 139 can be a translated version of the management workflow 153. While the example discusses translation of a management workflow 153, the management service 120 can also retrieve a device state definition 155 and translate it into a new workflow object 135 that matches a syntax of the set of workflow objects 135. While translation is indicated after the selection of the management resource, the management service 120 can also automatically translate the management resource before showing it in the management console 121.

In step 215, the management service 120 can include the translated version of the management workflow 153 in the drag-and-drop or canvas user interface area of the management console 121. The user can click or click-and-drag the translated version of the management workflow 153 from an imported resources area, or another tool user interface element of the management console 121. The translated version of the management workflow 153 can then be shown in the drag-and-drop or canvas user interface area. The user can then edit workflow objects 135 of the translated version of the management workflow 153 components through the management console 121.

In step 218, the management service 120 can transmit the translated version of the management workflow 153 to client devices 106. For example, the management service 120 could save the translated version of the management workflow 153 to a command queue 123. At periodic intervals, the management agent 145 could send a request to the management service 120 for any objects (e.g., translated versions of the management workflow 153) stored in the command queue 123 for the client device 106, and the management service 120 could provide them in response. In some implementations, the management agent 145 could directly retrieve objects stored in the command queue 123 without sending a request to the management service 120.

Once received, the client devices 106 can evaluate states 149 and perform a client-device-specific path or route through the client-device-driven management workflow 139 that is based on the translated version of the management workflow 153. Alternatively, the management service 120 can save the device-driven management workflow 139 for later deployment. The device-driven management workflow 139 can perform any of the functionality discussed. The device-driven management workflow 139 can also be saved as a smart resource workflow object 135 or another multi-step workflow object 135 for use in other device-driven management workflows 139. A smart resource workflow object 135 or another multi-step workflow object 135 can correspond to a device-driven management workflow 139 that can be represented by a single icon or graphic in another device-driven management workflows 139.

A smart resource workflow object 135 can refer to a device-driven management workflow 139 for comprehensive or universal deployment of enterprise resources 129 such as applications 147, scripts, databases, or files for a set of conditions specified by a comprehensiveness definition 137. As a result, the smart resource workflow object 135 can be used in other device-driven management workflows 139. For example, a single smart resource workflow object 135 can be used to deploy multiple different versions of an application 147 or a script depending on a platform or operating system 143 of a client device 106. A single smart resource workflow object 135 can be used to install or provide access to different databases or files based on a user group or security state 149 of the client device 106.

Figure 3:
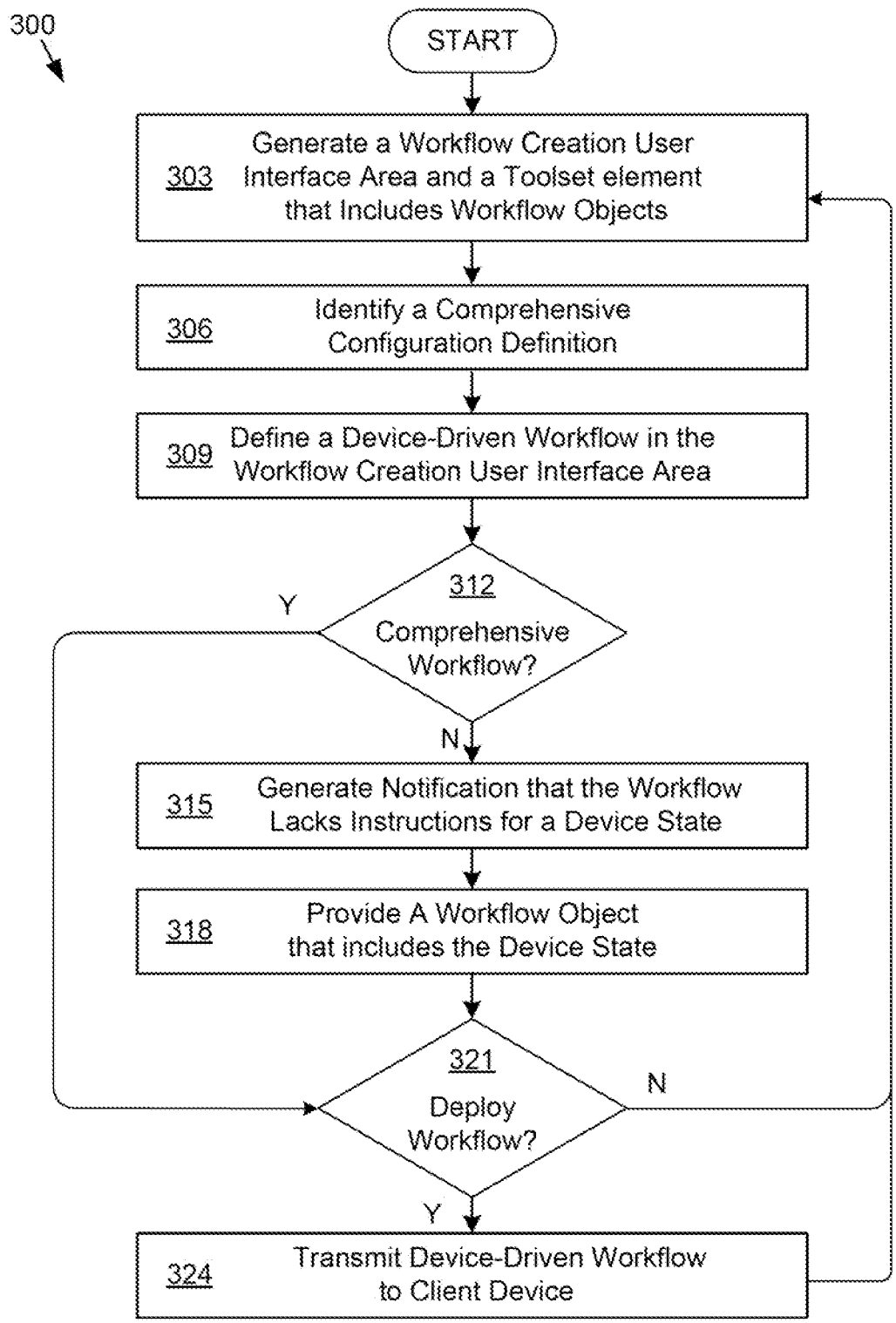
FIG. 3 illustrates another flowchart performed by components of the networked environment for device-driven management, according to various examples described herein.

FIG. 3 shows a flowchart 300 performed by components of the networked environment 100. Specifically, the flowchart 300 describes how the management service 120 provides tools that can create universal or comprehensive device-driven management workflows 139. This can include universal or smart applications as well as device-driven management workflows 139 for deployment or installation of enterprise resources 129, evaluation and enforcement of compliance rules on the client device 106, and other purposes. While the flowchart 300 is described as performed by the management service 120, it can also be considered functionality performed by the management console 121. Certain functionality described for the flowchart 300 can also be performed by other components of the networked environment 100. Segmentation and ordering indicated in the flowchart 300 is for example purposes only. The functionality described for a particular step can be performed in any order relative to the other steps described.

At step 303, the management service 120 can generate a management console 121 that includes a workflow creation user interface area and a tool panel that includes a set of workflow objects 135. The workflow creation user interface area can include a drag-and-drop canvas user interface area that shows the workflow objects 135 of a device-driven management workflow 139 in a workflow view. The workflow objects 135 can be selected, placed, moved, and connected in the drag-and-drop canvas to form device-driven management workflows 139. Other views and manipulation types can also be used as described.

At step 306, the management service 120 can identify a comprehensiveness definition 137 to use for a device-driven management workflow 139 shown in the workflow creation user interface area. For example, the management service 120 can analyze the workflow objects 135 of the device-driven management workflow 139 and identify a logical grouping of client devices 106 based on current limitations of the device-driven management workflow 139. The management service 120 can generate a dynamic workflow-specific comprehensiveness definition 137 that includes a superset of conditions including platforms, states 149, user groups, networks, geolocations, and applications 147 limited to the workflow-specific logical grouping of client devices 106. Alternatively, the user can select a predetermined or static comprehensiveness definition 137.

In step 309, the management service 120 can define a device-driven management workflow 139 based on user interactions identified through the workflow creation user interface area of the management console 121. For example, a user can drag one or more workflow objects 135 into the workflow creation user interface area and link them using connectors. The user can also select workflow objects 135, including the connectors, in order to edit specifications of the various workflow objects 135. The user can also incorporate management workflows 153, device state definitions 155, and modified versions of these management resources into the device-driven management workflow 139.

In step 312, the management service 120 can determine whether the device-driven management workflow 139 is comprehensive. For example, the management service 120 can compare the workflow objects 135 of the device-driven management workflow 139 to comprehensiveness definition 137. The comprehensiveness definition 137 can be a static comprehensiveness definition 137 or a dynamic comprehensiveness definition 137 that changes based on a detected set of limitations applicable to all paths through the device-driven management workflow 139. If the device-driven management workflow 139 includes all or a threshold percentage or amount of the conditions specified in the comprehensiveness definition 137, then the device-driven management workflow 139 can be considered comprehensive and the process can proceed to step 321. Otherwise, the device-driven management workflow 139 can be considered not comprehensive, and the process can move to step 315.

In step 315, the management service 120 can generate a notification that the device-driven management workflow 139 lacks instructions for a condition or device state 149 that is specified by the comprehensiveness definition 137. For example, the device-driven management workflow 139 can lack a path corresponding to a network condition (e.g., trusted, untrusted), geolocation, platform, or other condition. The device-driven management workflow 139 can lack instructions to ensure installation of a certain application 147 or another enterprise resource 129 that is specified by the comprehensiveness definition 137. The notification can be included in a pop-up user interface element or another informational or administrative user interface panel of the management console 121.

In step 318, the management service 120 can provide a workflow object 135 that includes the device state 149 that is specified by the comprehensiveness definition 137. For example, the management console 121 can include a pop-up user interface element or another user interface panel that shows the workflow object 135 that includes the device state 149. The workflow object 135 can also be highlighted or otherwise graphically emphasized in a toolset or another area of the management console 121. A user can select the workflow object 135 where shown in the management console 121 and incorporate the workflow object 135 into the device-driven management workflow 139. Alternatively, the management service 120 can show the state 149 in a pop-up user interface element or another user interface panel, and the user can select or manipulate the state 149 to incorporate the state 149 into an existing workflow object 135.

In step 321, the management service 120 can determine whether to deploy the device-driven management workflow 139. For example, the management console 121 can include a user interface element through which a user can indicate to deploy the device-driven management workflow 139 to a set of client devices 106. If the device-driven management workflow 139 is to be deployed, then the process can proceed to step 324. Otherwise the process can proceed to step 303.

In step 324, the management service 120 can transmit the device-driven management workflow 139 to a set of client devices 106. This could be done, for example, by placing the device-driven management workflow 139 into one or more command queues 123 from which the client devices 106 subsequently retrieve the device-driven management workflows 139. The set of client devices 106 can correspond to a user group, a device group, a platform-based group, or another logical grouping of client devices 106. The logical grouping of client devices 106 can be indicated in an entry point workflow object 135 of the device-driven management workflow 139.

Figure 4:
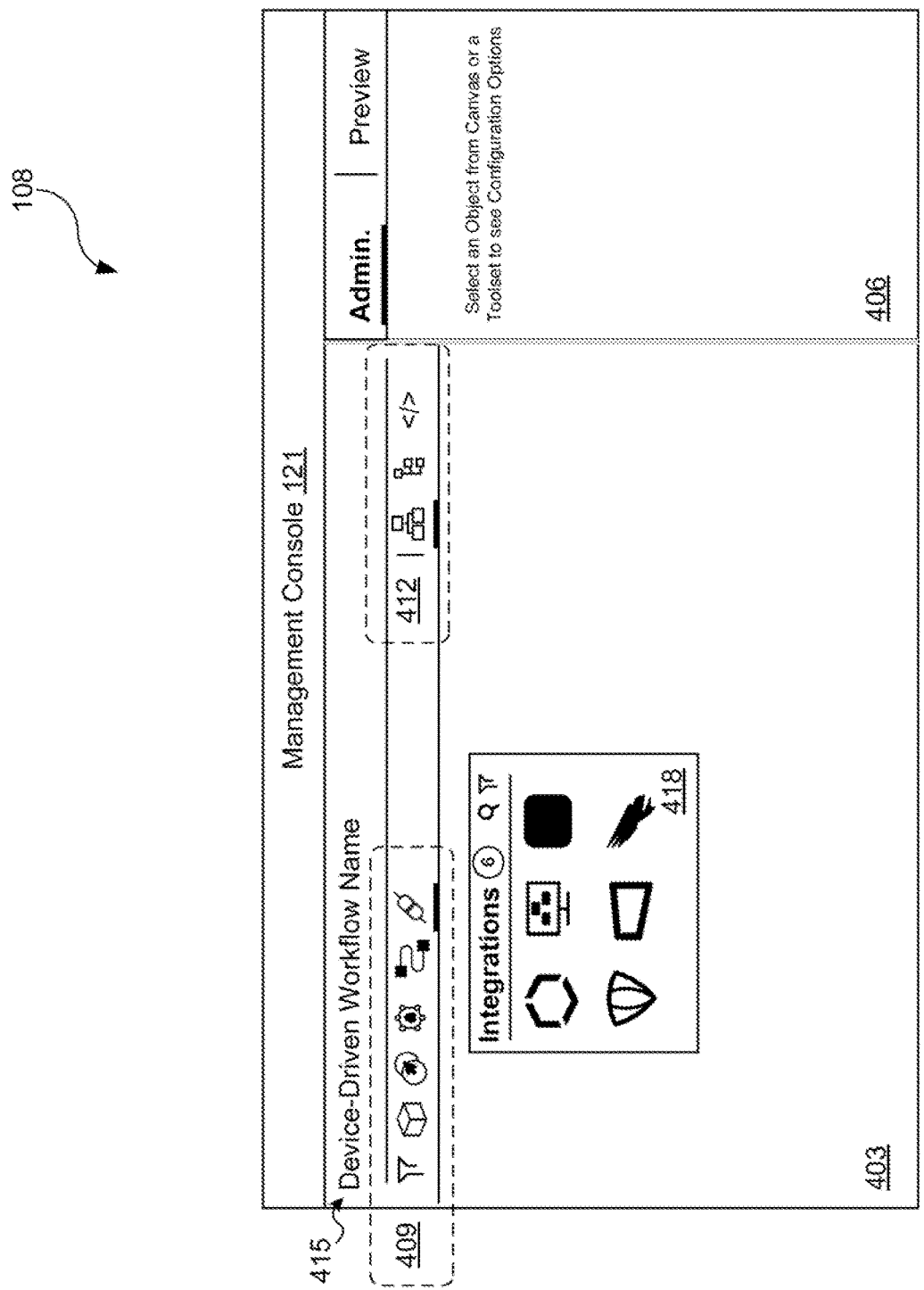
FIG. 4 illustrates an example user interface that provides tools for device-driven management using components of the networked environment, according to various examples described herein.

FIG. 4 shows an example user interface 108 of the management console 121. The user interface can include tools for device-driven management. For example, the management console 121 can include a workflow creation area 403, as well as a side panel 406 for options and configuration. The workflow creation area 403 can include a toolset selector 409, an interface type selector 412, as well as a name or identifier 415 of a device-driven management workflow 139.

The workflow creation area 403 can include a drag-and-drop canvas user interface that shows the workflow objects 135 of a device-driven management workflow 139 in a graphical workflow view that includes icon-type or other graphical representations of workflow objects 135 connected to one another using line-type connector workflow objects 135. Using the interface type selector 412, a user can change the workflow creation area 403 to include a programming language user interface area that shows the workflow objects 135 of a device-driven management workflow 139 in text instructions or code form; or a list or tree view that shows the workflow objects 135 of a device-driven management workflow 139. In some examples, the drag-and-drop canvas user interface can be in the workflow creation area 403, while the side panel 406 includes the programming language or the tree view of the device-driven management workflow 139.

The toolset selector 409 can include, from left to right, a filter icon, an inventory icon, a commands icon, a groups icon, a connector icon, a network service integrations icon, among others. A user selection of the filter icon can cause the management console 121 to show a toolset filtering element to filter the toolsets shown in the toolset selector 409.

A user selection of the inventory icon can cause the management console 121 to show an inventory toolset. The inventory toolset can include workflow objects 135 corresponding to enterprise resources 129 such as databases, certificates, files, scripts, and applications 147.

A user selection of the commands icon can cause the management console 121 to show a commands toolset. The commands toolset can include workflow objects 135 corresponding to commands that can be performed by an operating system 143, an application 147, or other instructions executed on the client device 106. For example, commands can include a reboot command, a logout command, an enterprise wipe command that removes enterprise resources 129 from the client device 106, a command to generate a local notification, a command to transmit a message, a command to update data in a local or remote database, a command to perform an action using a network service 109 or the management service 120, a command to set a host name of the client device 106, a command to set a wallpaper of the client device 106, and other commands.

A user selection of the groups icon can cause the management console 121 to show a groups toolset. The groups toolset can include workflow objects 135 corresponding to user groups, device groups, and other logical groupings of client devices 106. The groups toolset can be used to modify workflow objects 135 in the device-driven management workflow 139. For example, a group workflow object 135 can modify a connector workflow object 135, such as an entry point, a line connector, or a condition based on the specified group.

A user selection of the connectors icon can cause the management console 121 to show a connectors toolset. The connectors toolset can include workflow objects 135 corresponding to connectors including entry points, line connectors, and conditions. Entry point workflow objects 135 can be used to start a device-driven management workflow 139. If the device-driven management workflow 139 is a complete standalone workflow, then the entry point can specify a specific client device 106, or a user group, a device group, or another logical grouping of client devices 106 for the device-driven management workflow 139.

In this example, the toolset selector 409 indicates that the network service integrations icon is selected. The network service integrations toolset 418 can show a number of icons corresponding to network service integrations 138 with network services 109. The network service integrations toolset 418 can provide an indicator of a number of network service integrations 138 that are currently set up. The example here shows that there are six (6) network service integrations 138 currently configured to import management workflows 153, device state definitions 155, and other first- and third-party management resources for a device-driven management workflow 139.

Selection of a particular network service integration 138 from the network service integrations toolset 418 can update the network service integrations toolset 418 to show management workflows 153, device state definitions 155, and other management resources. Alternatively, selection of a particular network service integration 138 from the network service integrations toolset 418 can update the side panel to show management workflows 153, device state definitions 155, and other management resources.

The network service integrations toolset 418 can also include a search functionality and a filter functionality. For example, a user can select a search icon to bring up a search element through which a user-entered textual search query can be entered. The management console 121 can update the network service integrations toolset 418 or the side panel 406 to show network service integrations 138, management workflows 153, device state definitions 155, and other management resources corresponding to the query.

A user can select a filter icon of the network service integrations toolset 418 to bring up a filtering element through which a set of categories can be user-selected. The management console 121 can update the network service integrations toolset 418 or the side panel 406 to show network service integrations 138, management workflows 153, device state definitions 155, and other management resources corresponding to the user-selected category.

Figure 5:
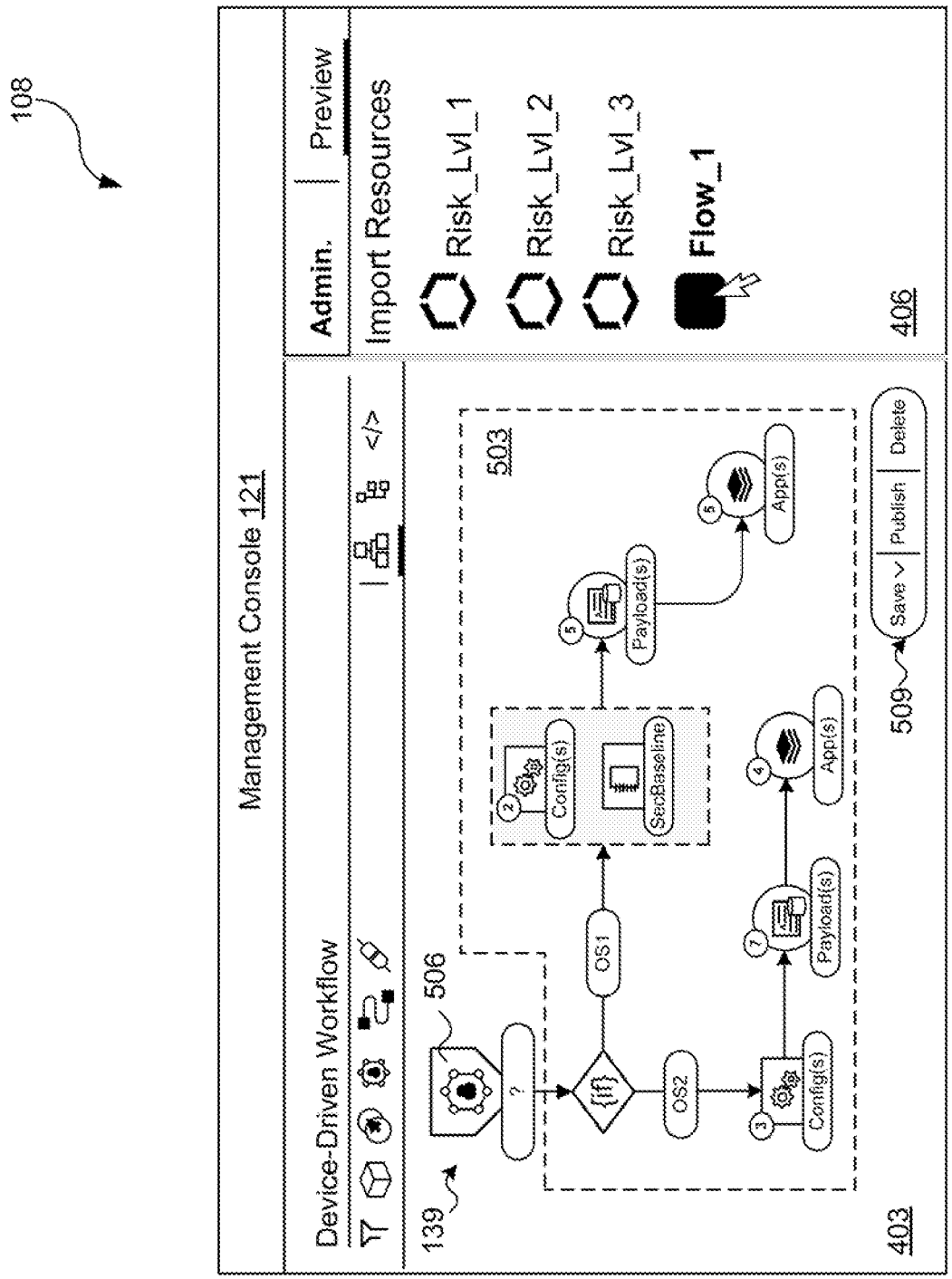
FIG. 5 illustrates another example user interface that provides tools for device-driven management using components of the networked environment, according to various examples described herein.

FIG. 5 shows an example user interface 108 of the management console 121. The user interface can include tools for device-driven management. For example, the management console 121 can include a workflow creation area 403, a side panel 406, and other components as discussed.

The workflow creation area 403 can include a device-driven management workflow 139 that is created using workflow objects 135. The side panel 406 can include a number of management resources that a user can select for inclusion in the workflow creation area 403 and the device-driven management workflow 139. The management resources can include device state definitions 155 and a management workflow 153, which can include first- and third-party management resources that are retrieved from network services 109 using network service integrations 138.

A user can manipulate a cursor, touchscreen, or other input device to select the management workflow 153 "Flow_1" The user can click, click-and-drag, or otherwise select the management workflow 153 and add it to the workflow creation area 403 as a set of workflow objects 135 of the device-driven management workflow 139. The workflow object group 503 can be a translated version of the management workflow 153 formatted as workflow objects 135 as discussed. The user can then edit the device-driven management workflow 139. For example, the user can add or edit an entry point 506 to specify a logical grouping of client devices 106 for the device-driven management workflow 139. The management console 121 also includes a user interface element 509 that can be user-manipulated to save, publish, or delete the device-driven management workflow 139. Publishing the device-driven management workflow 139 can involve transmitting the device-driven management workflow 139 to client devices 106 specified by the entry point 506.

The workflow object group 503 shows workflow objects 135 including an if-condition workflow object 135, an OS1 connector workflow object 135, and an OS2 connector workflow object 135, among others. When executed by a client device 106, the device-driven management workflow 139 or the management agent 145 can analyze states 149 to determine an operating system 143 of the client device 106. If the operating system 143 corresponds to that specified by the OS1 connector workflow object 135, then the branch of instructions corresponding to the OS1 connector workflow object 135 can be performed. If the operating system 143 corresponds to that specified by the OS2 connector workflow object 135, then the branch of instructions corresponding to the OS2 connector workflow object 135 can be performed. As a result, the device-driven management workflow 139 includes a branching sequence of instructions that branches based on states 149 that are evaluated on the end user's client device 106.

As a nonlimiting example, the branch of instructions corresponding to the OS1 connector workflow object 135 can install two configurations 133 and a security baseline 134. The bounding box around the two configurations 133 and the security baseline 134 can indicate that these workflow objects 135 are order agnostic, can be performed in any order including with partial or total concurrence, simultaneously, or otherwise. Thereafter, the branch of instructions indicates to install five payloads of data or other enterprise resources 129, and subsequently install five applications 147. The branch of instructions corresponding to the OS2 connector workflow object 135 can install three configurations 133, subsequently install seven payloads, and subsequently install four applications 147.

The management resources can also include risk levels and other device state definitions 155. The risk level definitions can be generated by a network service 109. In some examples, the risk level definitions can be made in the same syntax of the workflow objects 135, and in other examples the management service 120 can translate a first- or third-party syntax into a different syntax used by the workflow objects 135 to create the new workflow objects 135.

Risk level definitions can be used to modify workflow objects 135 in the device-driven management workflow 139. For example, a risk level definition workflow object 135 can modify a connector workflow object 135, such as an entry point, a line connector, or a condition based on the specified risk level definition. Risk level definitions can define a set of states 149 that are associated with that risk level. When executed on a client device 106 as part of a device-driven management workflow 139, the states 149 can be detected and compared to those specified by the risk level definition workflow object 135. The risk level definitions can be initially generated by machine learning or another method.

The risk level definitions can be periodically updated by the network service 109. However, the risk level definition workflow object 135 can specify a network location where the states 149 specified by the risk level definition can be updated to reflect changing security risks faced by client devices 106. The device-driven management workflow 139 can be deployed to a client device 106, and the client device 106 can update the states 149 that trigger the risk level definition workflow object 135. The management agent 145 can retrieve a risk level definition periodically and in response to a detected change of a state 149 of the client device 106. This can be achieved without contacting the management service 120 for a new or updated device-driven management workflow 139. While discussed with respect to risk level definitions, any device state definition 155 can specify a network location of a network service 109 that enables the client device 106 to update a workflow object 135 for that device state definition 155.

The management agent 145 can generate a risk score for the client device 106 based on the states 149 and the risk level definition. In other cases, the management agent 145 can periodically transmit states 149 to the network service 109 and can receive a risk score for the client device 106. The management agent 145 can compare the risk score to the risk level to determine whether to perform a branch of the device-driven management workflow 139 that corresponds to the risk level.

The if-condition workflow object 135, the OS1 connector workflow object 135, the OS2 connector workflow object 135, and other workflow objects 135 can be edited based on the device state definitions 155. For example, a device state definition 155, "Risk_Lvl_1" can be used to modify the OS1 connector workflow object 135 to replace a state 149 corresponding to OS1 with a state 149 corresponding to Risk_Lvl_1. The resulting Risk_Lvl_1 connector workflow object 135 can performs the corresponding branch of instructions when the management agent 145 detects a state 149 specified for device state definition 155 Risk_Lvl_1.

Figure 6:
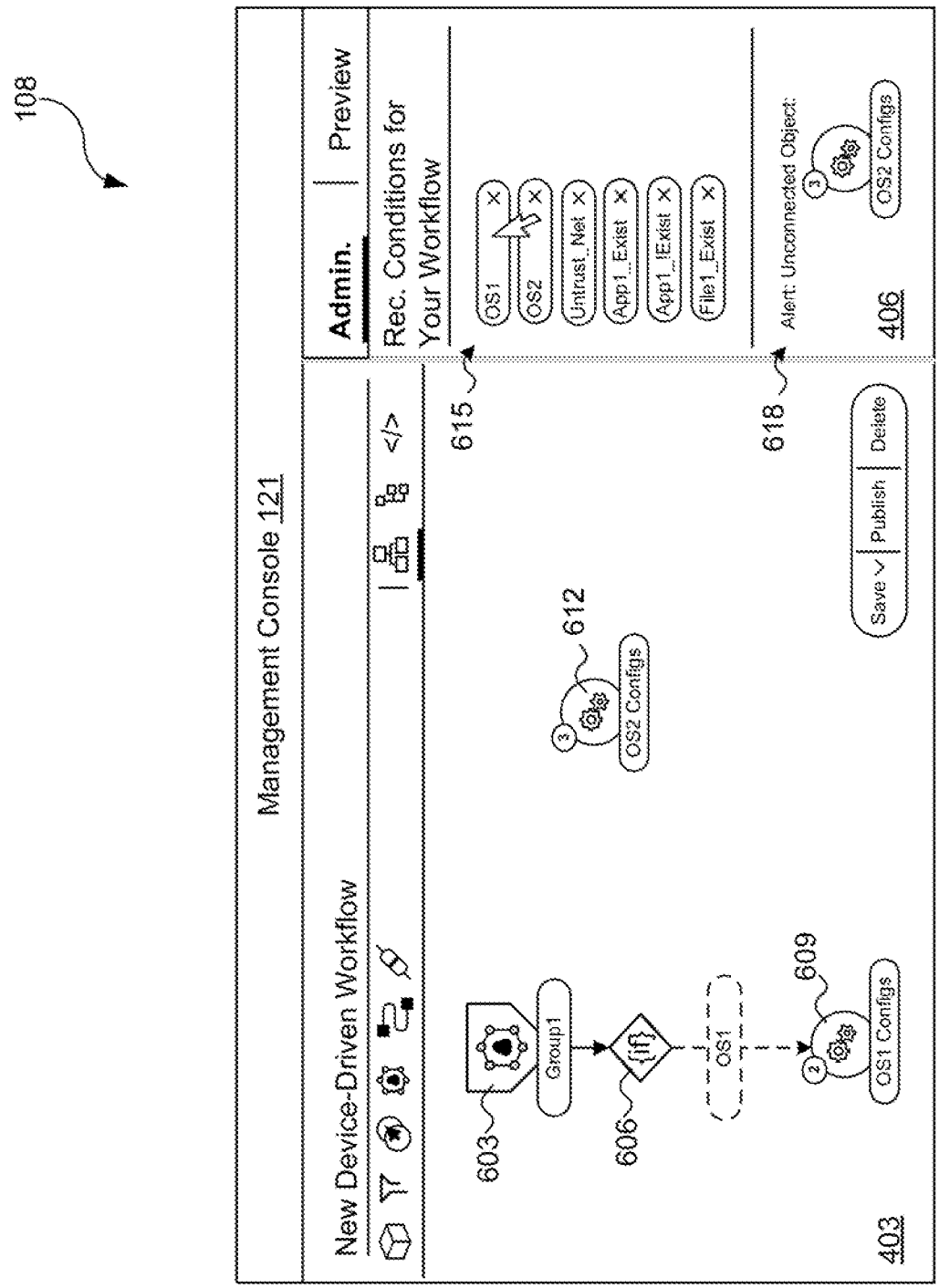
FIG. 6 illustrates another example user interface that provides tools for device-driven management using components of the networked environment, according to various examples described herein.

FIG. 6 shows another example user interface 108 of the management console 121. The user interface can include tools for device-driven management. The management console 121 can include a workflow creation area 403, a side panel 406, and other components as discussed.

The workflow creation area 403 can include an entry point workflow object 603 that specifies a user or device group "group 1." The workflow creation area 403 can also include an if-condition workflow object 606 connected to the entry point workflow object 603 without any branches or conditional actions specified. A user can drag or otherwise manipulate the management console 121 to place a configuration workflow object 609 and a configuration workflow object 612 into the workflow creation area 403. While the graphical representation of the configuration workflow object 609 states "OS1 Configs" the underlying workflow object 135 can specify an object type as a configuration installation type and can further specify an identifier of an operating system corresponding to "OS1." Likewise, an underlying workflow object 135 for the representation of configuration workflow object 612 can specify an object type as a configuration installation type, and can further specify an identifier of another operating system, this time corresponding to "OS2."

The management service 120 can analyze the workflow objects 135 that are in the workflow creation area 403 to identify recommendations to form a device-driven management workflow 139. The management service 120 can determine that the configuration workflow object 609 corresponds to an operating system "OS1" while the workflow object 612 corresponds to a mutually-exclusive operating system "OS2." As a result, the management service 120 can determine that these configuration workflow objects 609 and 612 can only be used together in a single device-driven management workflow 139 if there are branches that are performed in response to detected states 149 for the associated operating systems.

The management service 120 can update the side panel 406 or another user interface area of the management console 121 to include recommendations 615. Recommendations 615 can include a condition workflow object 135 that specifies an operating system "OS1." The management console 121 can also include a recommendation for a condition workflow object 135 that specifies an operating system "OS2." In some cases, a user selection of the recommended condition workflow object 135 can cause the object to appear connected in the device-driven management workflow 139. In other cases, the user can draw the connector and drag or otherwise modify the connector to include the recommended condition workflow object 135 that specifies the operating system "OS1."

The recommendations 615 can also include recommendations based on a comprehensiveness definition 137. The management service 120 can analyze the workflow objects 135 that are in the workflow creation area 403 based on a comprehensiveness definition 137 to identify comprehensiveness recommendations. A comprehensiveness definition 137 can identify a set of device states 149 or device conditions that the device-driven management workflows 139 can include in order to be considered comprehensive for group 1 or another set of client devices 106 specified by entry point workflow object 603. The management service 120 can identify that there are no conditional branches corresponding to states 149 corresponding to an untrusted network, the existence of app1, non-existence of app1, and the existence of file1 on a client device 106. The management service 120 can update the recommendations to include conditions "Untrust_Net," "App1_Exist," "App1_! Exist." and "File1_Exist."

An administrator can decide that for this particular device-driven management workflow 139, no conditional actions or branch of instructions need to be performed for a certain condition. The management console 121 can include a user interface element that when selected can mark the recommendation as considered, and/or remove the recommendation. The management console 121 can include alerts 618 that specify workflow objects 135 and branches that are disconnected or can otherwise result in non-functionality.

Figure 7:
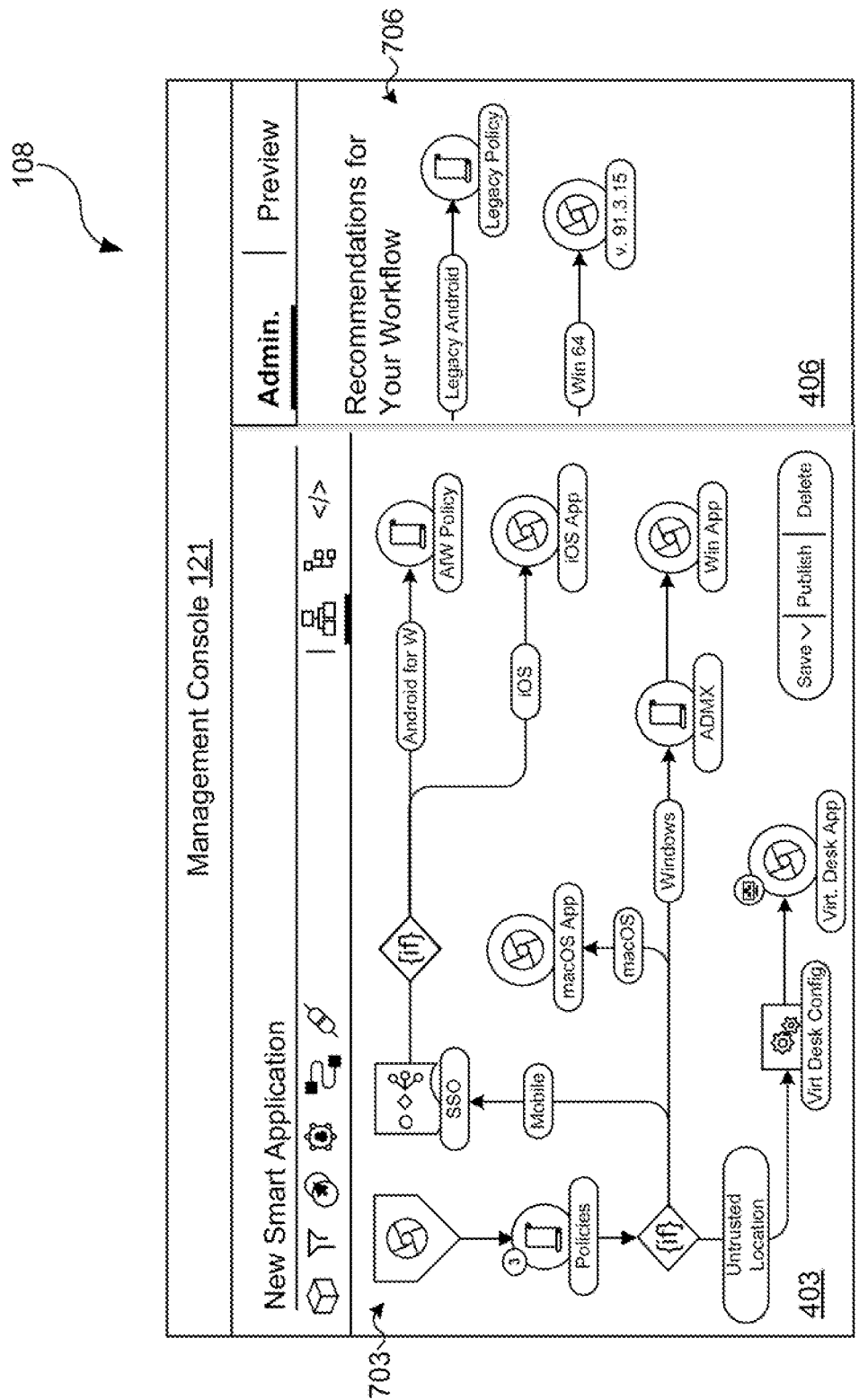
FIG. 7 illustrates another example user interface that provides tools for device-driven management using components of the networked environment, according to various examples described herein.

FIG. 7 shows another example user interface 108 of the management console 121. The user interface can include tools for device-driven management. The management console 121 can include a workflow creation area 403, a side panel 406, and other components as discussed. Generally, this drawing shows how the management console 121 provides tools to create a smart application 703 for use in a device-driven management workflow 139.

The smart application 703 can be considered a device-driven management workflow 139 that defines a branching set of instructions for deployment of an application 147. The entry point workflow object 135 of the smart application 703 can specify an application workflow object 135, rather than a logical group of client devices 106. A workflow of the smart application 703 can be invoked and performed if the application workflow object 135 is encountered in a device-driven management workflow 139. While this example describes a smart application 703 for deployment of an application 147, the description is generally applicable to smart resources for deployment of a script, a database, a file or set of files, a certificate, or another enterprise resource 129.

The smart application 703 can be a comprehensive device-driven management workflow 139 based on a comprehensiveness definition 137 for smart applications. This enables the smart application 703 to successfully provide access to an application 147 in different ways and for a wide variety of client devices 106, based on the states 149 of each client device 106.

In this nonlimiting example, the smart application 703 can install a number of policies 131 and then evaluate an if-condition based on states 149 of a client device 106. In this example, the if-condition can be configured to evaluate whether the client device 106 is in a trusted or untrusted geolocation or network location. If the location is untrusted, then the smart application 703 can perform a branch of instructions that installs a configuration 133 for virtual desktops and then configures the client device 106 to access a virtual desktop version of the application 147.

If the location is trusted, then the smart application 703 can evaluate whether the platform of the client device 106 is a mobile platform or a desktop platform such as macOS® or Windows®. If the platform of the client device 106 is macOS®, then a macOS® version of the application 147 can be installed. If the platform of the client device 106 is Windows®, then a Windows® version of the application 147 can be installed. If the platform of the client device 106 is a mobile platform, then a single sign on process can be performed on the client device 106. Thereafter, if the mobile platform of the client device 106 is an Android® for Work compatible platform, then an Android® for Work policy 131 can be installed, since the application 147 can be a default application 147 that is preinstalled on Android® platforms. If the mobile platform of the client device 106 is an iOS® platform, then an iOS® version of the application 147 can be installed.

The management console 121 can include recommendations 706 that are generated based on a comprehensiveness definition 137. The management service 120 can analyze the workflow objects 135 of the smart application 703 based on a comprehensiveness definition 137. The comprehensiveness definition 137 can identify a set of device states 149 or device conditions that the device-driven management workflows 139 can include in order to be considered comprehensive for a smart application 703.

The management service 120 can determine that the comprehensiveness definition 137 indicates that a legacy policy 131 should be used for legacy Android® platform client devices 106 and that the smart application 703 does not provide the legacy policy 131 for legacy Android® platform client devices 106. The management service 120 can generate a recommendation that provides a set of workflow objects 135 that provides the legacy policy 131 for legacy Android® platform client devices 106. A user can drag-and-drop, select, or otherwise manipulate the recommended set of workflow objects 135 to include it in the smart application 703.

The management service 120 can also determine that the comprehensiveness definition 137 indicates that a particular version of the application 147 should be used when states 149 indicate a 64-bit versions of Windows® and the current smart application 703 does not evaluate this state 149 or provide the version of the application 147. The management service 120 can generate a recommendation that provides a set of workflow objects 135 that provides the particular version of the application 147 for client devices 106 executing 64-bit versions of Windows®. A user can drag-and-drop, select, or otherwise manipulate the recommended set of workflow objects 135 to include it in the smart application 703.

Figure 8:
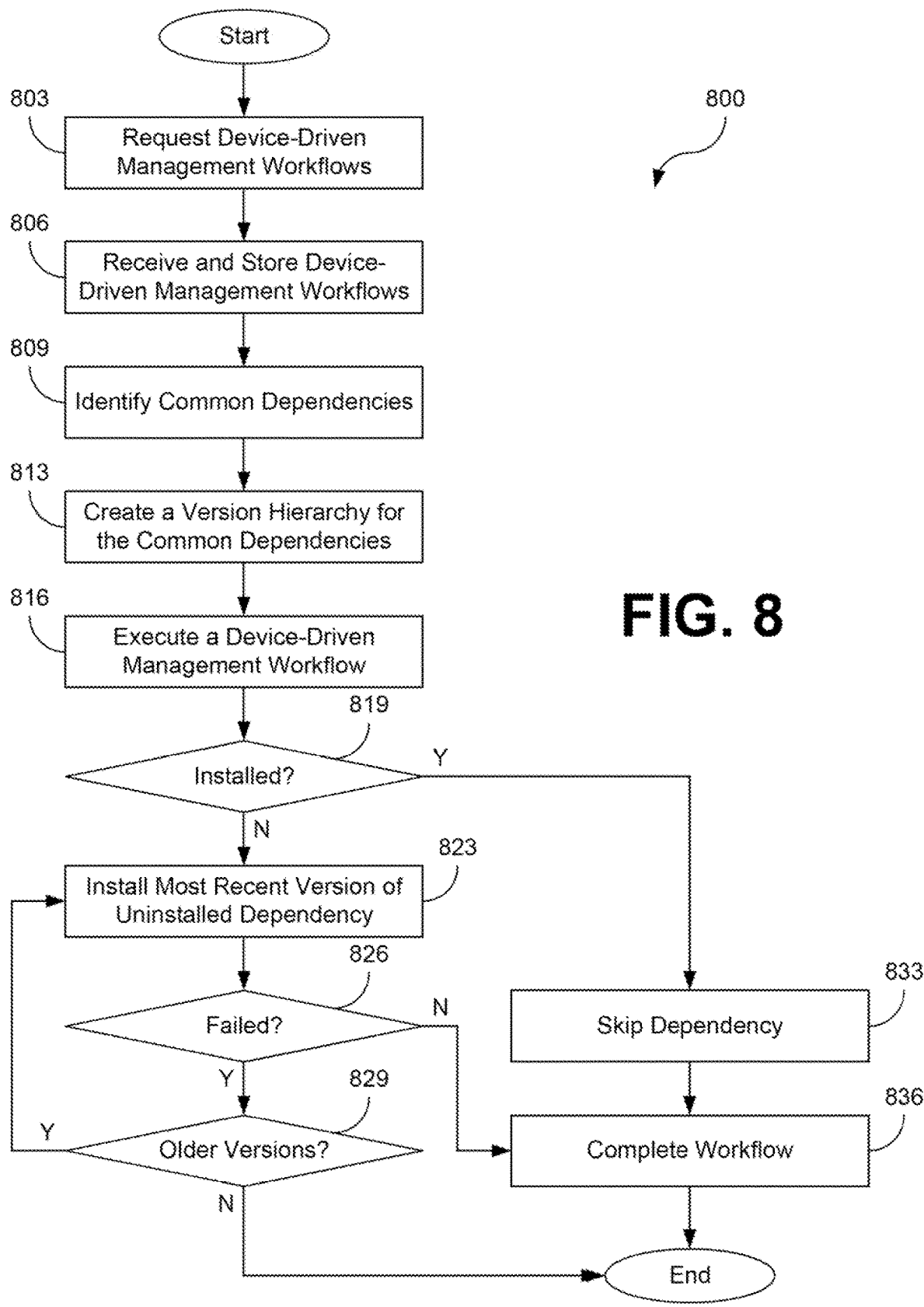
FIG. 8 illustrates another flowchart performed by components of the networked environment for device-driven management, according to various examples described herein.

FIG. 8 shows a flowchart 800 performed by components of the networked environment 100. Specifically, the flowchart 800 describes how the management agent 145 can execute, process, or otherwise implement device-driven management workflows 139 that include common dependencies 141. While the flowchart 800 is described as performed by the management agent 145, it can also be considered functionality performed by the client device 106. Certain functionality described for the flowchart 800 can also be performed by other components of the networked environment 100. Segmentation and ordering indicated in the flowchart 800 is for example purposes only. The functionality described for a particular step can be performed in any order relative to the other steps described.

Beginning with step 803, the management agent 145 can send a request to the management service 120 for one or more device-driven management workflows 139. This could be done periodically (e.g., as part of a regular polling request or checking by the management agent 145) or in response to an event (e.g., registration of the client device 106 with the management service 120).

Then at step 806, the management agent 145 can receive any device-driven management workflows 139 from the management service 120 that have been specified for the client device 106. For example, the management agent 145 could access the command queue 123 and retrieve the device-driven management workflows 139 from the command queue 123 that were placed in the command queue 123 by the management service 120 in response to the request sent at step 803. The device-driven management workflows 139 can be stored by the management agent 145 in a workflow queue 150 for later evaluation and/or execution.

Next, at step 809, the management agent 145 can evaluate the device-driven management workflows 139 stored in the workflow queue 150 to identify one or more common dependencies 141 between the device-driven management workflows 139 or individual tasks 140 specified or defined by the device-driven management workflows 139. For example, the management agent 145 could evaluate each of the device-driven management workflows 139 to determine which resources (e.g., configuration files, libraries, applications 147, etc.) individual ones of the device-driven management workflows 139 specify for installation. Where the same resource (e.g., the same configuration file, the same library, or the same application 147, etc.) is specified for installation, the management agent 145 could determine that the resource is a common dependency 141.

Moving on to step 813, the management agent 145 can create a version hierarchy 151 for each common dependency 141 identified at step 813. The version hierarchy 151 can specify the device-driven management workflows 139 associated with the common dependency 141 and the version of the common dependency 141 specified. For example, if Workflow A specified at least version 10 of a library as a dependency 141, Workflow B specified at least version 11 of the library as a dependency 141, and Workflow C specified at least version 8 of the library as a dependency 141, then the management agent 145 could create a version hierarchy 151 that lists version 11, version 10, and version 8 of the library in descending order.

Then at step 816, the management agent 145 can subsequently execute or process one of the device-driven management workflows 139 from the workflow queue 150. To process the device-driven management workflow 139, the management agent 145 could evaluate the ASL file that defines the device-driven management workflow 139 and implement the individual tasks 140 in the order specified.

Next at step 819, the management agent 145 can determine whether the common dependency 141 identified at step 809 has been installed. This check may be performed because the common dependency 141 may have already been installed (e.g., during earlier execution of another device-driven management workflow 139 that had been in the workflow queue 150). Accordingly, the management agent 145 may avoid reinstalling the common dependency 141 by determining whether it has already been installed. If the common dependency 141 has already been installed, then the process skips to step 833. However, if the common dependency 141 has not yet been installed, then the process proceeds to step 823.

If the process proceeds to step 823, the management agent 145 can attempt to install the highest or most recent of the common dependency 141. For example, the management agent 145 could reference the version hierarchy 151 created at step 813 for the common dependency 141 to determine which version of the common dependency 141 is the highest or most recent version. The management agent 145 could then attempt to install this version of the common dependency 141.

Then at step 826, the management agent 145 can determine whether installation of the common dependency 141 failed. The determination could be made using a variety of approaches. One approach is to determine whether an error message or error code was returned by the installation process (e.g., application or library installer). Another approach is to determine whether the installation process exceeded a predefined or pre-specified amount of time (e.g., "timed-out"). If installation was successful, then the process proceeds to step 836. However, if the installation were unsuccessful, then the process proceeds to step 829.

At step 829, the management agent 145 can evaluate the version hierarchy 151 to determine whether any lower or older versions of the common dependency 141 are listed. For example, if the version hierarchy 151 lists version 11, version 10, and version 8 of a library to be installed in descending order, and installation of version 11 had failed, the management agent 145 could determine that version 10 and/or version 8 of the library are options for installation in order to allow for device-driven management workflows 139 to be completed that do not depend on version 11 of the library to be installed. Therefore, if other versions of the common dependency 141 are listed in the version hierarchy 151, then the management agent 145 could remove the version of the dependency 141 that failed to install from the version hierarchy 151. The process could then return to step 823, where the management agent 145 could attempt installation of the highest or most recent version of the common dependency 141 that remained in the version hierarchy 151. However, if there are no other versions of the common dependency 141 listed or identified in the version hierarchy 151, then the process could end. In either event, the management agent 145 could also report to the management service 120 that the current device-driven management workflow 139 failed to complete and/or identify the dependency 141 that failed to install.

However, if the process proceeds to step 833, the management agent 145 can determine that installation of the dependency 141 can be skipped because another, compliant version has been already installed as part of a previous device-driven management workflow 139. Finally, at step 836, the management agent 145 can complete the device-driven management workflow 139 that was initiated at step 816.

Figure 9:
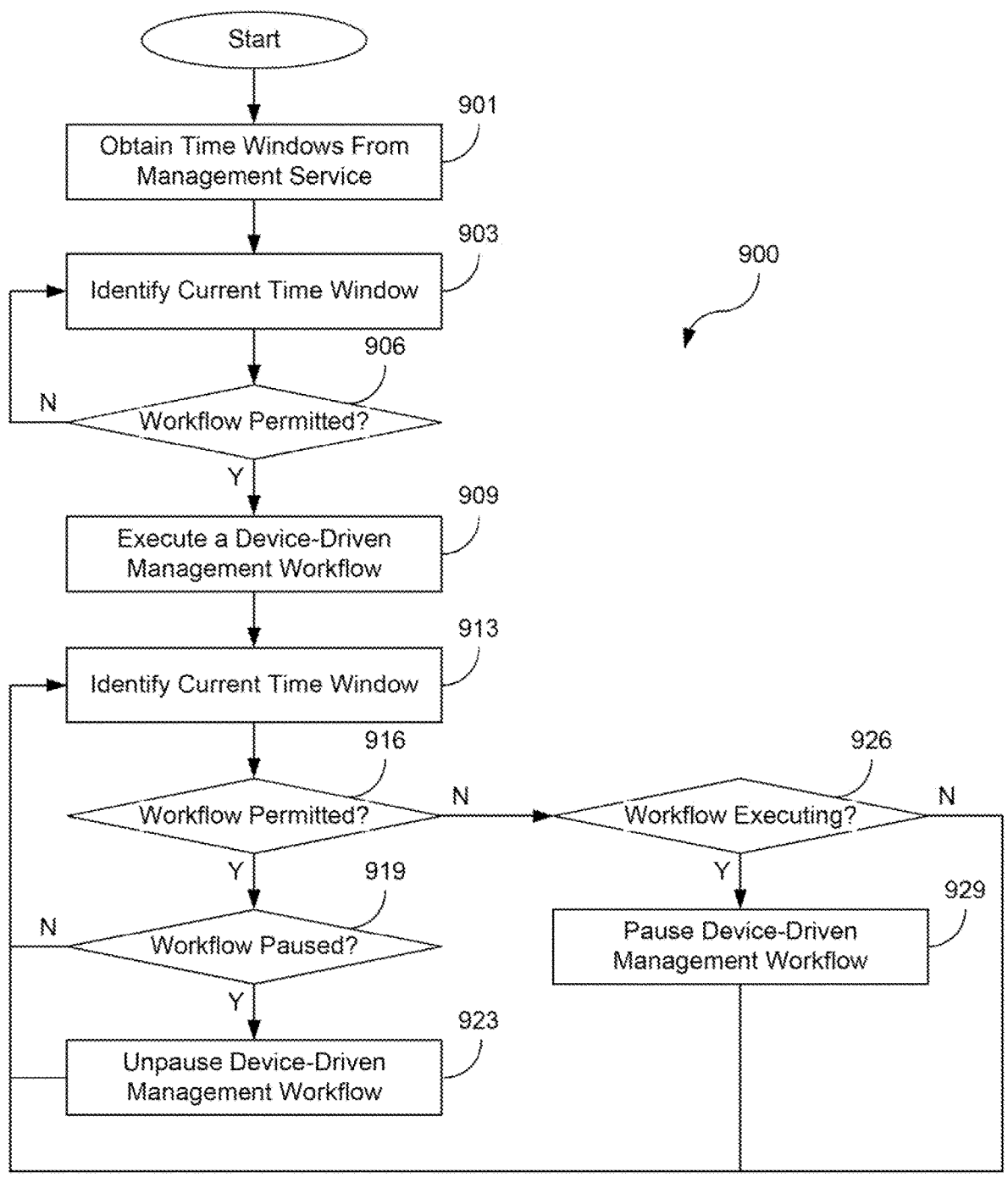
FIG. 9 illustrates another flowchart performed by components of the networked environment for device-driven management, according to various examples described herein.

FIG. 9 shows a flowchart 900 performed by components of the networked environment 100. Specifically, the flowchart 900 describes how the management agent 145 can coordinate the execute, process, or otherwise implement device-driven management workflows 139 within conflicting or potentially conflicting time windows 142. While the flowchart 900 is described as performed by the management agent 145, it can also be considered functionality performed by the client device 106. Certain functionality described for the flowchart 900 can also be performed by other components of the networked environment 100. Segmentation and ordering indicated in the flowchart 900 is for example purposes only. The functionality described for a particular step can be performed in any order relative to the other steps described.

Beginning with step 901, the management agent 145 can obtain one or more time windows 142 from the management service 120 and store them on the client device 106 for future reference. For example, the time windows 142 could be received in response to a request made by the management agent 145 to the management service 120. As another example, the management agent 145 could retrieve the time windows 142 from a command queue 123 maintained by the management service 120, wherein the time windows 142 were placed in the command queue 123 by the management service 120 in response to a request received from the management agent 145. In other examples, the time windows 142 could be sent by the management service 120 without prompting from the management agent 145 (e.g., by "pushing" the time windows 142 to the management agent 145).

Proceeding to step 903, the management agent 145 can identify the current time window. This could be done by querying the system clock of the client device 106 to determine the date and time. The management agent 145 could then evaluate the time windows 142 to determine which time window(s) 142 match, overlap, encompass, or otherwise include the current date and time.

Then at step 906, the management agent 145 can determine whether a device-driven management workflow 139 stored in the workflow queue 150 can be executed based on the time window(s) 142 identified at step 903. For example, the management agent 145 could evaluate a first device-driven management workflow 139 in the workflow queue 150 to determine the type of device-driven management workflow 139 and compare it to the class(es) of the time window(s) 142 identified at step 909. For instance, if the current time falls within a time window 142 that is classified as a maintenance window, then the management agent 145 could determine that any device-driven management workflow 139 can be executed. As another example, if the management agent 145 determines that the current time falls within a time window 142 classified as "business hours," the management agent 145 might determine that no device-driven management workflow 139 should be implemented to avoid impacting a user's ability to work during business hours. If multiple time windows 142 overlap, then the time windows 142 could be compared and a highest priority or highest ranking time window 142 could be used to determine whether to execute the device-driven management workflow 139. For example, a default time window 142 could specify that any device-driven management workflows 139 could be executed, but an overlapping, higher-ranked time window 142 could specify that the current date and time fall within business hours and execution of a device-driven management workflow 139 would be prohibited. Accordingly, the higher-ranking time window 142 specifying business hours would be used by the management agent 145 to determine whether to implement the device-driven management workflow 139. Similarly, a default time window 142 could specify that device-driven management workflows 139 are not to be executed, while an overlapping, higher-ranked time window 142 could specify that the current date and time fall within a maintenance window and execution of a device-driven management workflow 139 is permitted. As another example, a time window 142 for an emergency maintenance window could overlap with a time window 142 specifying business hours, in which case the time window 142 for emergency maintenance might supersede the time window 142 for the business hours. If a determination is made that the device-driven management workflow 139 can be executed in the current time window 142, then the process can proceed to step 909. However, if the determination is made that the device-driven management workflow 139 cannot currently be executed, then the process can return to step 903 for continued evaluation until an appropriate time window 142 for execution of the device-driven management workflow 139 is identified. The process at step 906 could be performed for each device-driven management workflow 139 in the workflow queue 150 or the only the first device-driven management workflow 139 in the workflow queue 150.

Next at step 909, the management agent 145 can execute the device-driven management workflow 139. For example, the management agent 145 could process or execute individual tasks 140 specified by the device-driven management workflow 139 in the order specified. This could be done by processing or evaluating the Amazon State Language (ASL) file that defines the device-driven management workflow 139 and the tasks 140 of the device-driven management workflow 139.

Moving onto step 913, the management agent 145 can identify the current time window 142 as the task 140 or device-driven management workflow 139 continues to execute. This can be done at periodic intervals (e.g., every minute, every ten (10) minutes, every fifteen (15) minutes, every thirty (30) minutes, every hour, etc.) to determine whether the device-driven management workflow 139 started executing during a permissible time window 142, but is continuing execution in an impermissible time window 142. The process of step 913 can be performed in the manner previously described with respect to step 903.

Proceeding to step 916, the management agent 145 can determine whether the device-driven management workflow 139 is permitted to execute during the current time window 142. The process at step 916 could be performed in a similar manner as previously described with respect to step 906. If the device-driven management workflow 139 is permitted to execute during the current time window 142, then the process proceeds to step 919. If the device-driven management workflow 139 is not permitted to execute during the current time window 142, then the process instead proceeds to step 926.

If the process proceeds to step 919, the management agent 145 can determine whether the device-driven management workflow 139 is currently paused. This could be done, for example, by evaluating the current state 149 of the device-driven management workflow 139 or evaluating the current state 149 of the client device 106 to determine whether any processes associated with the device-driven management workflow 139 are currently executing. The device-driven management workflow 139 may have been paused, for example, due to the device-driven management workflow 139 previously executing during a prohibited time window 142. If the device-driven management workflow 139 is not paused, then the management agent 145 could conclude that the device-driven management workflow 139 is currently executing and the process could proceed back to step 913. However, if the device-driven management workflow 139 is currently paused, the process could proceed to step 923.

Then, at step 923, the management agent 145 can unpause or otherwise cause the device-driven management workflow 139 to resume execution or operation. For example, the management agent 145 could continue executing the device-driven management workflow 139 by continuing the previously processed task 140 or beginning the next task 140 specified by the device-driven management workflow 139. The process could then return to step 913.

However, if the process proceeds to step 926, the management agent 145 can determine whether the device-driven management workflow 139 is currently executing. This could be done, for example, by evaluating the current state 149 of the device-driven management workflow 139 or evaluating the current state 149 of the client device 106 to determine whether any processes associated with the device-driven management workflow 139 are currently executing. If the device-driven management workflow 139 is currently executing, then the process could proceed to step 929. However, if the device-driven management workflow 139 is not currently executing, then the process could return to step 913.

If the process proceeds to step 929, the management agent 145 can pause the device-driven management workflow 139. For example, the management agent 145 could cause any processes currently executing to pause. The management agent 145 could also save the current state 149 of the task 140 of the device-driven management workflow 139 that is currently being executed as well as the current state 149 of the device-driven management workflow 139 as well. As a result, the device-driven management workflow 139 could be resumed at a later point in time. Once the device-driven management workflow 139 is paused, the process can return to step 913.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. it is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g. storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of" X, Y, or Z, unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z, etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
    a computing device comprising a processor and a memory, and
    machine-readable instructions stored in the memory that, when executed by the processor, cause the computing device to at least:
        evaluate a plurality of workflows stored in a workflow queue to identify a common dependency of the plurality of workflows;
        create a version hierarchy for the common dependency of the plurality of workflows, the version hierarchy identifying multiple versions of the common dependency;
        in response to execution of a first one of the plurality of workflows stored in the workflow queue, evaluate the version hierarchy to identify a most recent version of the common dependency; and
        initiate installation of the most recent version of the common dependency.

2. The system of claim 1, wherein the machine-readable instructions stored in the memory, when executed by the processor, further cause the computing device to at least:
    determine that the installation of the most recent version of the common dependency has failed;
    in response to the determination that the installation of the most recent version of the common dependency has failed, evaluate the version hierarchy to identify a second most recent version of the common dependency;
    initiate installation of the second most recent version of the common dependency; and
    block execution of individual ones of the plurality of workflows that are dependent on the most recent version of the common dependency.

3. The system of claim 2, wherein the machine-readable instructions stored in the memory, when executed by the processor, further cause the computing device to at least send a message to a management service that the individual ones of the plurality of workflows that are dependent on the most recent version of the common dependency have failed.

4. The system of claim 1, wherein the machine-readable instructions stored in the memory, when executed by the processor, further cause the computing device to at least:
    send a request to a management service for the plurality of workflows;
    receive the plurality of workflows from the management service; and
    store the plurality of workflows from the management service in the workflow queue.

5. The system of claim 1, wherein the common dependency is a configuration file.

6. The system of claim 1, wherein the common dependency is a library to be installed on the computing device.

7. The system of claim 1, wherein the common dependency is an application to be installed on the computing device.

8. A computer-implemented method, comprising:
    evaluating a plurality of workflows stored in a workflow queue to identify a common dependency of the plurality of workflows;
    creating a version hierarchy for the common dependency of the plurality of workflows, the version hierarchy identifying multiple versions of the common dependency;
    in response to execution of a first one of the plurality of workflows stored in the workflow queue, evaluating the version hierarchy to identify a most recent version of the common dependency; and
    initiating installation of the most recent version of the common dependency.

9. The computer-implemented method of claim 8, further comprising:
    determining that the installation of the most recent version of the common dependency has failed;
    in response to determining that the installation of the most recent version of the common dependency has failed, evaluating the version hierarchy to identify a second most recent version of the common dependency;
    initiating installation of the second most recent version of the common dependency; and blocking execution of individual ones of the plurality of workflows that are dependent on the most recent version of the common dependency.

10. The computer-implemented method of claim 8, further comprising sending a message to a management service that the individual ones of the plurality of workflows that are dependent on the most recent version of the common dependency have failed.

11. The computer-implemented method of claim 8, further comprising:
sending a request to a management service for the plurality of workflows;
receiving the plurality of workflows from the management service; and
storing the plurality of workflows from the management service in the workflow queue.

12. The computer-implemented method of claim 8, wherein the common dependency is a configuration file.

13. The method of claim 8, wherein the common dependency is a library file.

14. The method of claim 8, wherein the common dependency is an application file.

15. A non-transitory, computer-readable medium comprising machine-readable instructions stored in a memory that, when executed by a processor of a client device, cause the client device to at least:
evaluate a plurality of workflows stored in a workflow queue to identify a common dependency of the plurality of workflows;
create a version hierarchy for the common dependency of the plurality of workflows, the version hierarchy identifying multiple versions of the common dependency;
in response to execution of a first one of the plurality of workflows stored in the workflow queue, evaluate the version hierarchy to identify a most recent version of the common dependency; and
initiate installation of the most recent version of the common dependency.

16. The non-transitory, computer-readable medium of claim 15, wherein the machine-readable instructions stored in the memory, when executed by the processor, further cause the client device to at least:
determine that the installation of the most recent version of the common dependency has failed;
in response to the determination that the installation of the most recent version of the common dependency has failed, evaluate the version hierarchy to identify a second most recent version of the common dependency;
initiate installation of the second most recent version of the common dependency; and
block execution of individual ones of the plurality of workflows that are dependent on the most recent version of the common dependency.

17. The non-transitory, computer-readable medium of claim 16, wherein the machine-readable instructions stored in the memory, when executed by the processor, further cause the client device to at least send a message to a management service that the individual ones of the plurality of workflows that are dependent on the most recent version of the common dependency have failed.

18. The non-transitory, computer-readable medium of claim 15, wherein the machine-readable instructions stored in the memory, when executed by the processor, further cause the client device to at least:
send a request to a management service for the plurality of workflows;
receive the plurality of workflows from the management service; and
store the plurality of workflows from the management service in the workflow queue.

19. The non-transitory, computer-readable medium of claim 15, wherein the common dependency is a library to be installed on the client device.

20. The non-transitory, computer-readable medium of claim 15, wherein the common dependency is an application to be installed on the client device.

* * * * *